United States Patent [19]

Mir

[11] 4,371,892
[45] Feb. 1, 1983

[54] LIGHT VALVE IMAGING WITH OPTIMIZED ADDRESSING POTENTIAL(S) TO REDUCE INTER-PIXEL NONUNIFORMITY

[75] Inventor: José M. Mir, Rochester, N.Y.

[73] Assignee: Eastman Kodak Company, Rochester, N.Y.

[21] Appl. No.: 230,095

[22] Filed: Jan. 29, 1981

[51] Int. Cl.³ .............................................. H04N 1/46
[52] U.S. Cl. .......................................... 358/75; 355/4
[58] Field of Search ...................... 358/75, 61, 56, 232, 358/236; 355/4, 35

[56] References Cited

U.S. PATENT DOCUMENTS

| | | | |
|---|---|---|---|
| 3,428,743 | 2/1969 | Hanlon | 358/61 |
| 3,891,560 | 6/1975 | Chester | 358/61 |
| 4,229,095 | 10/1980 | Mir | 430/42 |

*Primary Examiner*—Michael A. Masinick
*Attorney, Agent, or Firm*—John D. Husser

[57] ABSTRACT

Electronic imaging apparatus of the kind having an electro-optic light valve array effects more uniform inter-element light transmission by utilizing predetermined, nominal activating potentials. In one preferred embodiment the potentials are proximate the array's half-wave voltage. In a related aspect color period activations are effected by means of a plurality of discrete sub-period activations which can be of different duration and binarily related. Such activations are preferably effected by means of a serial-in, parallel-out shift register.

22 Claims, 6 Drawing Figures

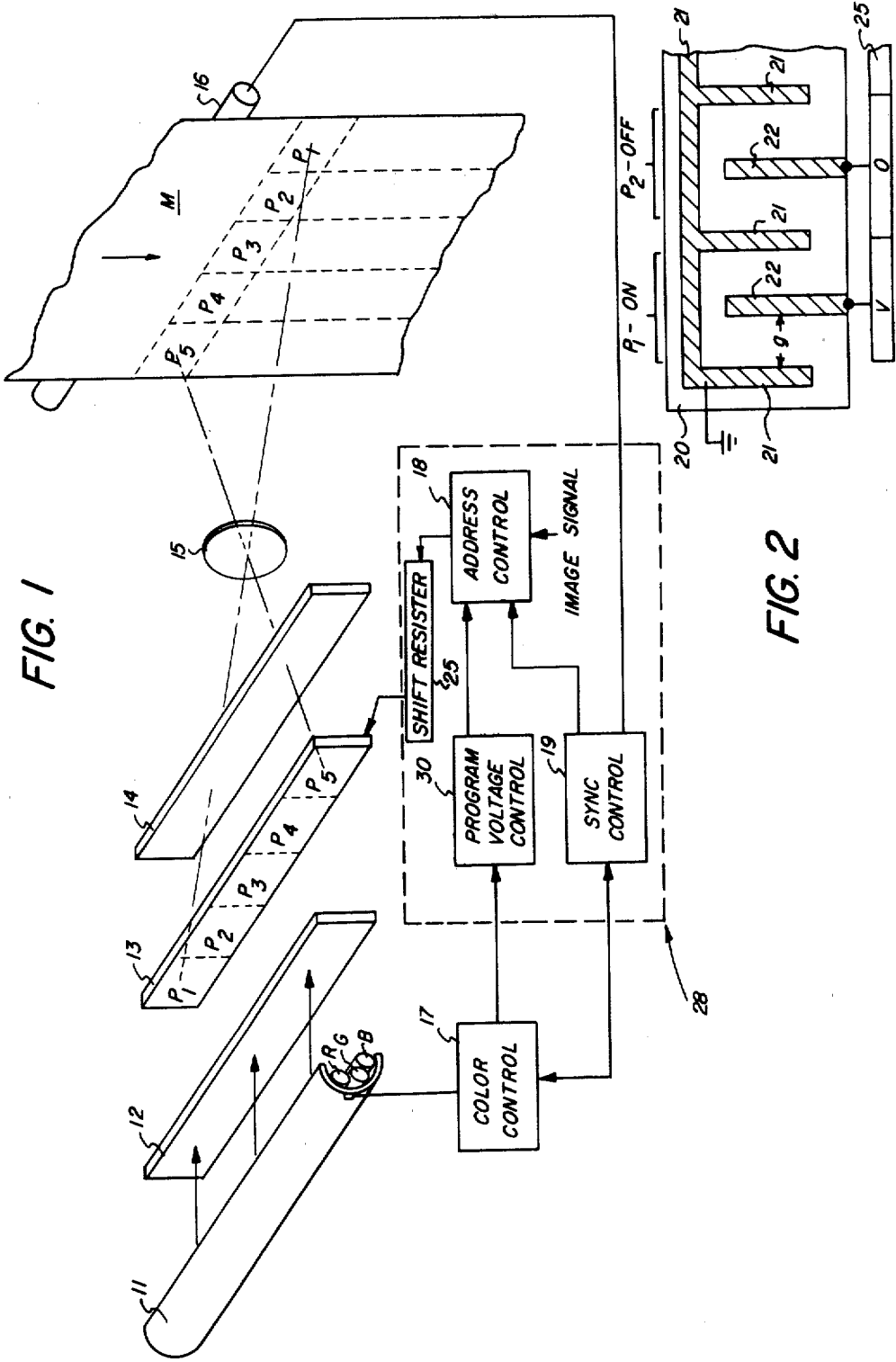

LIGHT VALVE IMAGING WITH OPTIMIZED ADDRESSING POTENTIAL(S) TO REDUCE INTER-PIXEL NONUNIFORMITY

CROSS-REFERENCE TO RELATED APPLICATIONS

Reference is made herein to U.S. patent application Ser. No. 230,096, entitled "Electronic Color Imaging Apparatus Having Improved Color Control Device", filed Jan. 29, 1981, in the name of J. M. Mir; U.S. patent application Ser. No. 230,099, entitled "Light Valve Imaging Apparatus Having Improved Addressing Electrode Structure", filed Jan. 29, 1981, in the names of J. M. Mir and J. R. Varner; U.S. patent application Ser. No. 230,089, entitled "Light Valve Imaging Apparatus Having Improved Optical Configuration", filed Jan. 29, 1981, in the name of J. R. Varner and U.S. patent application Ser. No. 230,092, entitled "Improved Light Valve Imaging Apparatus and Method for Providing Gray Scale", filed Jan. 29, 1981, in the name of J. M. Mir.

BACKGROUND OF THE INVENTION

1. Field of the Invention

The present invention relates to apparatus and method for forming a color image (on a recording medium or for viewing) from an electrical signal and more particularly to improvements in electronic color imaging apparatus and method of the kind using an array of individually addressable light valves.

2. Brief Description of the Prior Art

My U.S. Pat. No. 4,229,095 discloses various embodiments of electronic color-imaging apparatus that utilize arrays of separately-addressable, pixel (picture element) sized, electro-optical means to effect multicolor exposure of panchromatic imaging media. One preferred kind of electro-optical means disclosed in that patent is a light valve comprising a panel of ferro-electric ceramic material, such as lanthanum doped lead zirconate titanate (PLZT) sandwiched between crossed polarizers and activated to operate in a quadratic Kerr cell mode. Thus an array of such light valves comprises a panel of PLZT material with a plurality of interleaved electrodes formed on one major surface in a manner facilitating the selective application of discrete electrical fields across (in a direction perpendicular to the direction of viewing) discrete surface areas of the plate. Upon application of such fields, the PLZT material becomes birefringent and rotates the direction of polarization of incident light by an extent dependent on the field magnitude. This results in the transmission of light through the PLZT panel and polarizers varying as a function of the electric fields. A color image is formed electronically by selectively opening and closing of such light valves in synchronization with the energization of red, green and blue exposing sources and according to the red, green and blue color information for the pixels of that image.

My above-mentioned patent also teaches that, for continuous tone imaging, the electrical energization of the light valves can be varied to provide density variations, i.e., a gray scale. Three exemplary modes for varying such electrical energization are described, viz (1) varying the voltage level that is continuously applied during a nominal exposure period; (2) varying the period of voltage application with a nominal voltage magnitude; and (3) providing a stepped voltage signal during each exposure period and energizing the light valves during the stage of the period when the desired voltage level exists.

In certain applications, e.g. where it is desired to produce high quality continuous tone images such as photographic prints, a detractive artifact has been noted in imaging with light valve arrays that are electrically addressed by the above-described techniques. Specifically, in continuous tone areas a visible density difference is sometimes evident between adjacent pixel regions which have been exposed by light valves that received substantially identical electrical energizations. When exposure is made with relative movement between the imaging media and linear light valve arrays, these density differences are particularly detractive, appearing as streaks or bands.

SUMMARY OF THE INVENTION

In one significant aspect, it is a purpose of the present invention to provide means and method for reducing the distractive artifacts such streaking and banding described above and thus improve electronic, light-valve imaging such as disclosed in my above-mentioned patent.

In general, the present invention accomplishes more uniform imaging with light valve arrays by applying a predetermined, nominal potential(s) to the array elements during their respective periods of activation. The magnitude of such potential(s) is selected to minimize inter-pixel transmission non-uniformity e.g. as proximate in magnitude to the elements half-wave voltage (for a particular light color) to minimize non-uniformity due to inter-pixel electro-optic coefficient variation. In one preferred color imaging embodiment the light-valve-activating potentials differ according to the particular light color transmission activated thereby. In another preferred color imaging embodiment, the light-valve-activating potentials are at a single optimizing level for all light transmissions, the level being selected to optimize transmission uniformity of all colors or of a particularly significant light color, e.g., that in the 500 nm to 600 nm range to which visual preception is most sensitive.

In another aspect the present invention improves electronic imaging with light valve arrays by implementing each activation period of the light valves with a plurality of discrete sub-period activations, all at a predetermined, nominal potential(s). In one preferred embodiment incorporating this aspect, the sub-period activations are of different length and most preferably the different sub-period lengths are binarily related. In a further advantageous aspect of the present invention, the light valve elements are addressed by means of a serial-in, parallel-out shift register.

BRIEF DESCRIPTION OF THE DRAWINGS

The subsequent description of preferred embodiments of the invention refers to the attached drawings in which:

FIG. 1 is a schematic perspective view of one preferred embodiment of the present invention;

FIG. 2 is a plan view of a portion of an exemplary electro-optic modulator suitable for use in the FIG. 1 apparatus;

DETAILED DESCRIPTION OF THE PREFERRED EMBODIMENTS

Figure 3:
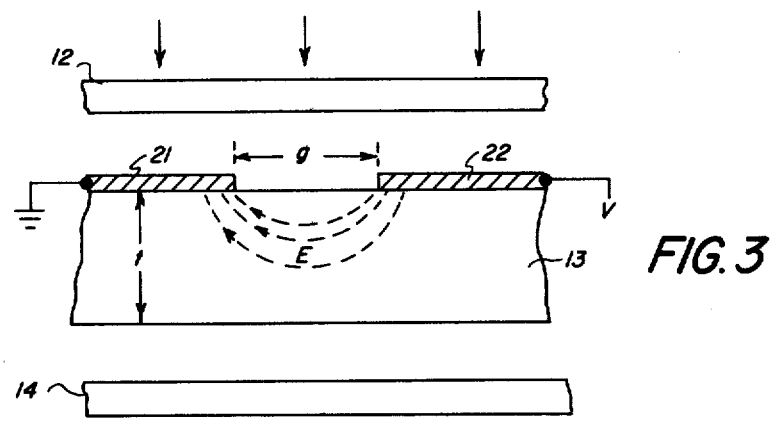
FIG. 3 is an enlarged cross-sectional view of a portion of the FIG. 2 modulator structure.

Referring to FIG. 1, the electronic color imaging apparatus 10 there illustrated comprises an illumination source 11 for uniformly illuminating electro-optic modulator 13, through entrance polarizer 12, with different light colors in a sequential fashion. The illumination source can include separately-energizable red (R), green (G) and blue (B) light sources as illustrated or a panchromatic source and moving multicolor filter as disclosed in my aforementioned U.S. Pat. No. 4,229,095 or can be an electro-optic controlled source such as disclosed in U.S. patent application Ser. No. 230,096, entitled "Electronic Color Imaging Apparatus Having Improved Color Control Device", filed Jan. 29, 1981, in the name of J. M. Mir. The electro-optic modulator 13 can be formed of a material such as disclosed in U.S. Pat. No. 4,229,095, which transforms from an isotropic, non-polar state to a birefringent polar state in response to application of an electric field. One preferred material is 9/65/35 PLZT.

As shown in more detail in FIG. 2, the modulator has reference electrodes 21 and signal electrodes 22 formed on the surface thereof in a configuration adapted to provide discrete, separately-activatable electric fields transversely across the pixel portions $P_1$-$P_5$ of the electro-optic panel 20. In the embodiment illustrated in FIG. 2, the reference electrodes 21 are commonly coupled to a source of reference potential, e.g., ground and the signal electrodes of each pixel portion are separately addressable with a potential by addressing means, e.g. including serial-in parallel-out shift register 25 to activate their respective pixels to an ON or OFF condition. An exemplary addressing ("V" potential applied, "O" no potential applied) is shown in FIG. 2 for the pixel ON, OFF conditions indicated. There are a variety of electrode configurations which can be utilized to create discrete, separately-activatable fields transversely across the discrete pixel portions of a panel of electro-optic material, some of which are disclosed in copending U.S. patent application Ser. No. 230,099, entitled "Light Valve Imaging Apparatus Having Improved Addressing Electrode Structure" and filed Jan. 29, 1981 in the names of J. M. Mir and J. R. Varner. The teachings of that application are incorporated herein by this reference.

In general, the application of an activating field across the inter-electrode gaps "g" of a pixel portion of the electro-optic material causes it to transform to a birefringent state and rotate the direction of polarization of light passing therethrough. Thus the polarized light from entrance polarizer 12 is rotated by activated pixels and is not rotated by non-activated pixels. Exit polarizer 14 is crossed (i.e. oriented with its direction of polarization at substantially 90°) relative to entrance polarizer 12, and therefore light passing through activated pixel portions of the modulator 13 passes through exit polarizer while light passing through non-activated modulator portions does not. Lens means illustrated schematically as 15 images the modulator array 13 at the apparatus exposure station past which a recording medium M is moved by transport means 16. Alternative means for uniformly illuminating the light valve array and for imaging the array on the recording medium are disclosed in copending U.S. patent application Ser. No. 230,089, entitled "Light Valve Imaging Apparatus Having Improved Optical Configuration", and filed Jan. 29, 1981, in the name of J. R. Varner. The disclosure of that application is incorporated herein by this reference.

The movement of recording medium by transport 16, the energization of illumination source 11 by color control 17 and the activation of shift register 25 by address control 18 are all synchronized, e.g. by synchronization control 19 so that the $P_1$-$P_5$ pixel portions of each line of the recording medium are exposed or not to the different colors of light in accordance with the color image information of the image to be reproduced. That image information is carried to address control in the form of an electrical image signal, e.g. such as a T.V. video signal. It will be appreciated that all multicolor information can be input during a single pass of the recording medium (in which case the illumination source would provide at least three separate color pulses per line) or that the medium can make multiple passes (e.g. once for each of red, green and blue exposures). Regardless of which of these or other addressing approaches is utilized, it is highly desirable that the pixels of modulator 13 exhibit a uniform modulating response. It has been noted, however, that complete uniformity of response is quite difficult to attain and as a result bands or streaks are sometimes visible on the recording medium as differences in density due to different exposures caused by non-uniformity in the pixels of modulator such as 13. This can be more fully appreciated if it is supposed that modulator 13 in FIG. 1 is addressed to uniformly expose all portions of the medium M moving past the exposure station. Thus all pixels of the modulator would be addressed with the same activating voltage for each line. The result should be a completely uniform density; however, if the individual pixels exhibit non-uniform response, the density of bands respectively exposed by each (indicated by dotted lines in FIG. 1) will have a different density which is detractive, particularly in continuous tone areas of an image.

I have found that detractive artifacts of the type described above, which relate to modulating non-uniformities of such electro-optic modulator arrays, can be reduced significantly by providing, as part of the addressing means 28, program voltage control means 30 that cooperates with other portions of the addressing system for the electronic imaging apparatus. Various exemplary forms for such a program voltage control means will be described subsequently; however, first a description of the physical phenomena pertaining to such non-uniformities and to their amelioration, in accordance with the present invention, will be helpful.

Referring for this purpose to FIG. 3, the parameters which might have significant influence on the uniformity of modulation by a light valve such as shown in FIGS. 1 and 2 can be considered in more detail. These include the gaps "g" between electrodes, the thickness "t" of the modulator, the electric field E induced by the voltage V applied to the signal electrode and the crystallographic and compositional variation of the electro-optic material forming the modulator.

The electrode gap width controls the amplitude and penetration of the field E and thus (as will be explained) the amount of light transmitted. Also, it defines the area of light transmission and thus the total light output. It has been found that careful fabrication of the electrode structure to achieve uniformity in configuration is effective to acceptably minimize this source of exposure non-uniformity. Similarly, it has been found that the exposure uniformity is not seriously affected by variation in t, if thickness tolerances are in the order of ±0.2%, which can be achieved without undue difficulty. Variations in applied electrical field are likewise controllable within an acceptable range, i.e. one which removes it as a significant concern with respect to exposure uniformity. Of course, the illumination source varies, but this effect is slowly-varying and not a serious problem.

Thus, the materials variations mentioned above remain as possible culprits with regard to significant exposure non-uniformity. In this regard, it may be helpful to reiterate that the light modulating effect of the light valve construction (i.e. the electrode bearing modulator 13 and crossed polarizers 12 and 13) is implemented by the modulator's shifting or non-shifting of the polarization direction of transmitted light. This modulating effect can be termed relative retardation $\Delta R$ and the physical parameters affecting such modulation are the birefringence $\Delta n$ and the optical path over which such birefringence is effective. The birefringence of such modulator is in turn dependent on the refractive index of the material "n", the applied field "E" and the electro-optic coefficient of the material "R", generally in the relation:

$$\Delta n = \tfrac{1}{2} n^3 \cdot R \cdot E^2.$$

By analysis and experiment, I have found that small variations in the electro-optic coefficient R can, in certain instances, produce substantial non-uniformity of light transmission through the light valve structure to the recording medium. Such variations in electric coefficient are believed to be caused both by crystallographic and compositional variations of the electro-optic material; and I have found that in light valve structures of the type shown in FIGS. 1, 2, and 3, non-uniformity of transmission due to electro-optic coefficient variations can be dramatically reduced by operating at predetermined, optimum voltage level(s).

Figure 4:
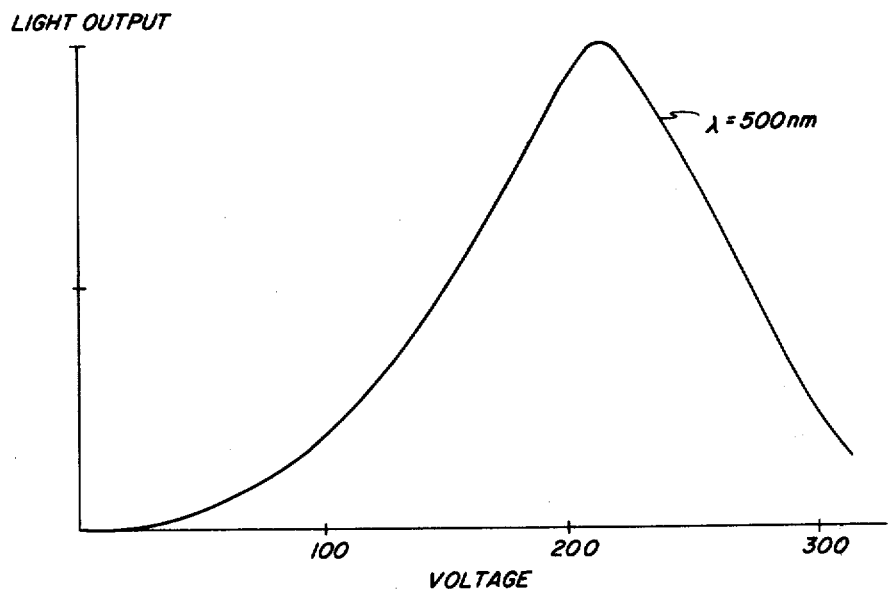
FIG. 4 is a plot indicating the variance of light output as a function of activating voltage for a particular light valve construction and parameter light wavelength.

The value of such optimum levels depends on physical parameters of the specific modulator utilized, viz. the electrode gap "g", the modulator thickness "t" and the electro-optic coefficient of the material and can most readily be ascertained for a specific light valve configuration using simple empirical data and selection modes hereinafter described. This can be further understood by referring to FIG. 4 where there is illustrated a plot of average element-light-transmission of a light valve array such as shown in FIGS. 1, 2 and 3 as a function of voltage applied to the signal electrode. This particular plot was made of the transmission of 500 nm light through a PLZT wafer having a nominal thickness of 8 mils and a nominal electrode gap of 4 mils; however, similar curves will evolve when light measurements are made of the transmission of different light valve array constructions and other light wavelengths.

The voltage of maximum transmission has been termed the "half-wave voltage" because the relative retardation of the polarization components parallel and perpendicular to the electric field at this voltage is $\lambda/2$ for the transmitted light wavelength, causing a 90° rotation in the direction of polarization of the light by the modulator. I have found that by operating at a voltage level proximate maximum, or zone of zero slope, of such curve, non-uniformity of transmission due to variations in electro-optic coefficient of the material are substantially reduced.

This finding has highly useful design applications with respect to light valve imaging apparatus. First, from the viewpoint of minimizing inter-pixel exposure non-uniformities in continuous tone imaging, it is highly advantageous to use a predetermined voltage level(s)-variable exposure time approach for obtaining density variation in the image, such voltage level(s) being selected in accordance with the foregoing teachings. Secondly, I have found that in certain multicolor imaging applications, it is highly useful to vary the predetermined activating voltage level in synchronization with the different color exposure periods. This can be more readily appreciated by referring to FIG. 5 wherein a plot similar to FIG. 4 has been made for the same light valve construction but with a plurality of different light colors. It will be noted that the half-wave voltage for different colors varies significantly, so that if an optimized level e.g. 185 volts for blue light (450 nm) was selected for all exposures it would not achieve the desirable results of the present invention for green (525 nm) or red (650 nm) light exposures. Thus it is advantageous to vary the activating voltage for different color exposures. In an alternative embodiment useful for certain color imaging, it is advantageous to select a single optimum multicolor voltage which is selected as a compromise between the several voltage levels tailored for particular colors. In this regard, the green light exposure has been found to be the one in which density variations are most visually perceptible and a compromise half-wave voltage selected for a predetermined wavelength in the range of from about 500–600 nm can be highly useful in certain applications.

Referring again to FIG. 1, the manner in which the present invention is incorporated in the electronic imaging apparatus there shown will be explained. Thus, in one mode of operation the movement of the recording medium M through the exposure station by drive 16 is synchronized by control 19 with the successive activation of color control 17 to provide successive red, green and blue color pulses from light source 11 during the passage of each line of the recording medium past the light valve array. At the same time the synchronization control 19 regulates address control 18 to address image information to the modulator 13 in proper timed relation with the medium movement and color pulses. In accordance with the present invention, program voltage control 30 is provided to regulate the activating voltage applied to pixel portions of the modulator in accordance with the particular color of exposure then being implemented. That is, during the red exposure period, the program voltage control adjusts address control so that the pixel portions of the modulator that are addressed with an "ON" voltage are activated by the predetermined half-wave voltage that is selected as optimal for minimizing inter-pixel non-uniformity of red light transmission (e.g. for the modulator described with respect to FIG. 5 approximately 280 volts). Similarly, during green exposure the address control is regulated by the program voltage control to provide activating voltages optimal for inter-pixel uniformity of green light transmission (e.g. about 230 volts for the modulator described with respect to FIG. 5). In the same manner the activating voltage would be adjusted for the blue light exposure (e.g. to about 195 volts for the FIG. 5 modulator).

It will be noted that the object of this approach is to obtain uniform intensity of transmission of the various light valves when they are in an "ON" condition. Thus to achieve gray scale (i.e. variation in the level of exposure or the density of the exposed image) it is necessary to vary length of exposure of various pixels of the recording medium. This can be done by providing the address control with individual counters for each pixel portion of the modulator; however, a more preferred approach is described in more detail in my copending U.S. Application Ser. No. 230,092, entitled "Improved Light Valve Imaging Apparatus and Method for Providing Gray Scale" and filed Jan. 29, 1981, in the name of J. M. Mir. This application discloses apparatus utilizing a plurality of binarily related sub-period exposures for each color exposure period of each line and its teachings are hereby incorporated by this reference. By either of these exposure length variation techniques the magnitude of exposure (i.e. the total light of a particular color reaching a given pixel of the recording medium) can be controlled, while still operating at the selected predetermined voltage that is optimal from the viewpoint of minimizing inter-pixel non-uniformity.

It will be appreciated that the mode of operation just described can be varied in many ways without departing from the scope of the present invention. For example, the exposure of the recording medium could occur in three separate passes, one for exposing red color information, one for green and one for blue. In this mode the program voltage control 30 would adjust the voltage applied to the modulator 13 between passes instead of during each line period.

In accordance with the embodiment of the present invention wherein an optimal "compromise" voltage is selected, rather than individual optimal voltages for each color, the program voltage control will regulate address control to apply this voltage during each pixel activation. Again, however, gray scale will be implemented by varying exposure length at a predetermined intensity level rather than varying intensity. It will be understood that hybrid approaches are possible, e.g. selecting one "compromise voltage" for green and blue exposures and a different optimal voltage for red exposure.

Another important variation in structure and mode of operation of the present invention is to select a predetermined activating potential(s) which are somewhat different than the half-wave voltage to take into account transmission variation resulting from scattering variation and/or electrode spacing variation, in addition to that resulting from electro-optic coefficient variation. Although I have found the transmission variation due to electro-optic coefficient variation to be the significantly predominate cause of inter-pixel exposure non-uniformity, transmission uniformity is also induced by scattering and electrode spacing variations and these latter two parameters each have a different optimizing voltage level (viz. about 0.85 the half-wave voltage for electrode spacing and at the quarter-wave voltage for scattering). In applications where these other two parameters have a significant effect on overall transmission variation, a predetermined voltage level can be selected to minimize the net transmission variation. This would shift the predetermined operating voltage to a level below the half-wave voltage. Various other modifications in structure and mode of operation will occur to those skilled in the art having the benefit of the general approach of the present invention.

Figure 5:
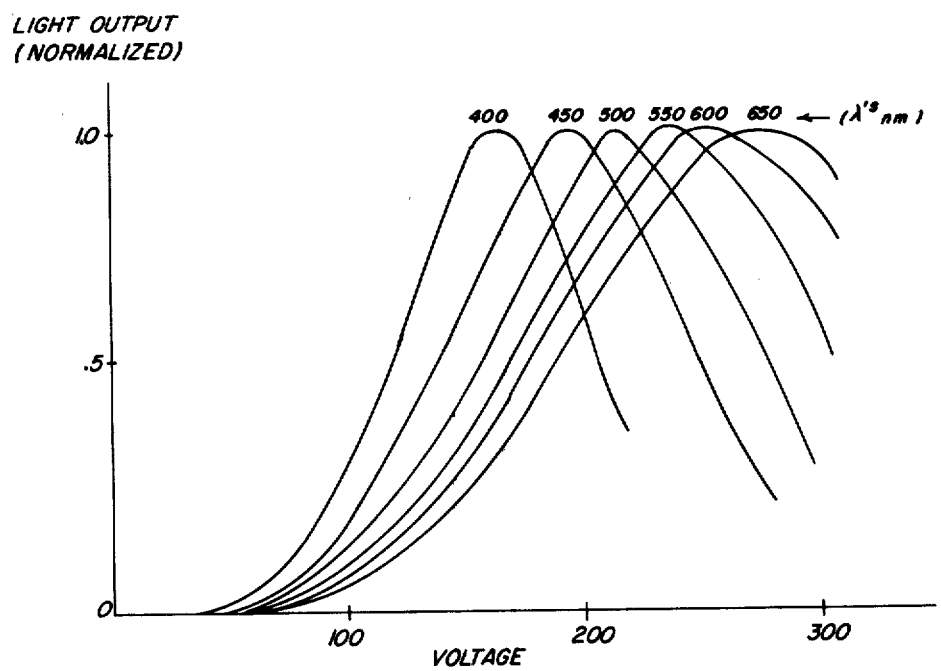
FIG. 5 is a plot indicating, for different light wavelengths, the variance of light output of a given light valve such as shown in FIG. 1 with applied activating voltage.
Figure 6:
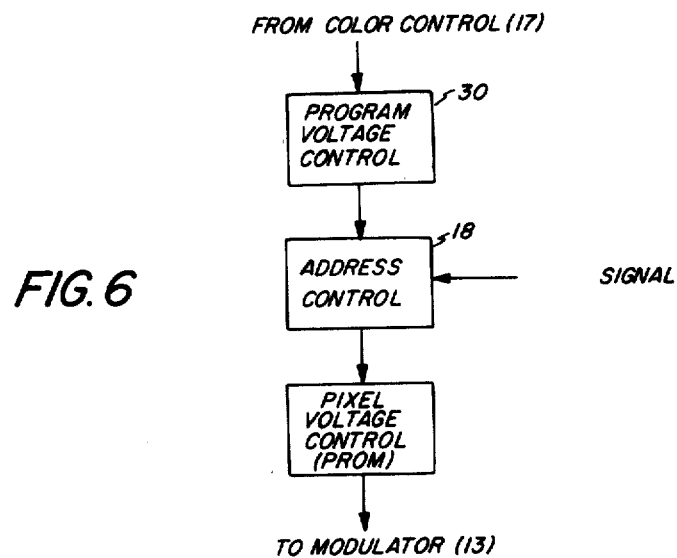
FIG. 6 is a diagram indicating schematically an alternative embodiment of control means for use in accordance with the present invention with apparatus such as shown in FIG. 1.

A further enhancement of the present invention is illustrated in FIG. 6. In this embodiment, the program voltage control 30 can be utilized to generally set the address control means 18 in accordance with the present invention, i.e. either with individual optimal voltages for each color or with compromise optimal voltages. However, in the FIG. 6 embodiment the outputs from address control for each pixel portion of modulator 13 are modified to further improve inter-pixel transmission uniformity. This can be accomplished by pixel voltage control 60 which can be e.g. a programmable read only memory (PROM), which is programmed to vary the general program voltage to further tailor it on a per pixel basis. Thus, if each pixel of an array exhibits slightly different curves such as shown in FIG. 5, the control 60 can further adjust the voltage from nominal voltage control to optimize light transmission. It will be appreciated that in some instances the PROM control 60 could be substituted for the programmable voltage control 30; however, this may result in more complex electronics.

The invention has been described in detail with particular reference to certain preferred embodiments thereof, but it will be understood that variations and modifications can be effected within the spirit and scope of the invention.

What is claimed is:

1. In electronic imaging apparatus of the type including (1) an electro-optic light valve array which comprises a plurality of discretely addressable elements, (2) means for illuminating elements of said array with light and (3) addressing means for activating said elements between light transmitting and non-transmitting conditions in accordance with image information, the improvement wherein said addressing means is adapted to apply to said elements, during all activating sequences of each activation period, predetermined nominal activating potential(s) of magnitude selected to minimize inter-element light transmission variation, whereby the light transmissions of the elements of said light valve array are rendered more uniform.

2. The invention defined in claim 1 wherein said addressing means further includes means for implementing each activation period with a plurality of discrete sub-period activations, all of said predetermined, nominal potential(s).

3. The invention defined in claim 2 wherein said sub-period activations are of different length.

4. The invention defined in claim 3 wherein the lengths of said sub-periods are binarily related.

5. The invention defined in claims 1, 2, 3 or 4 wherein said addressing means includes serial-in, parallel-out shift register means having an input adapted to receive an electrical signal containing said image information and outputs respectively coupled to elements of said light valve array.

6. The invention defined in claim 1 wherein said predetermined, nominal activating potential(s) are proximate the array half-wave voltage for the light being transmitted during the activation period.

7. In electronic color imaging apparatus of the type including (1) an electro-optic light valve array which comprises a plurality of discretely addressable elements, (2) means for sequentially illuminating the elements of said array with different colored light, respectively during different color periods and (3) addressing means for activating said elements, during such different color periods, between light transmitting and non-transmitting conditions in accordance with image color information, the improvement wherein said addressing means includes:

means for applying different predetermined, nominal activating potentials to such elements, respectively during each different color period, such different potentials respectively being proximate in magnitude to the light valve elements' different half-wavelength voltages for the different light colors of said different color periods, whereby the light transmissions of the elements of said light valve array are rendered more uniform.

8. The invention defined in claim 7 wherein said addressing means further includes means for implementing activation during said different color periods respectively with a plurality of discrete sub-period activations of the predetermined, nominal potential corresponding to the half-wave voltage for the colors of that color period.

9. The invention defined in claim 8 wherein said sub-period activations are of different length.

10. The invention defined in claim 9 wherein the lengths of said sub-periods are binarily related.

11. The invention defined in claims 8, 9 or 10 wherein said addressing means includes serial-in, parallel-out shift register means having an input adapted to receive an electrical signal containing said image color information and outputs respectively coupled to elements of said light valve array.

12. In electronic color imaging apparatus of the type including (1) a light valve array which comprises a plurality of discretely addressable electro-optic elements, (2) means for illuminating elements of said array with different colored light respectively during sequential color periods and (3) addressing means for activating said elements between light transmitting and non-transmitting conditions during each color period in accordance with the image information pertinent to that color, the improvement wherein said addressing means is adapted to effect element activations with at least one predetermined, nominal potential selected to reduce the inter-element transmission variation whereby the light transmissions of the elements of said light valve array are rendered more uniform.

13. The invention defined in claim 12 wherein said addressing means is adapted to activate elements during all color periods with a single predetermined nominal potential which is selected to be proximate the elements' half-wave voltage for a light color in the wavelength range of from about 500 nm to about 600 nm.

14. The invention defined in claim 12 wherein said addressing means is adapted to activate elements with at least two different predetermined nominal potentials, respectively during different color periods.

15. The invention defined in claim 12 wherein said addressing means is adapted to activate elements with three different predetermined nominal potentials, respectively during three different color periods.

16. The invention defined in claim 15 wherein each of said three different predetermined nominal potentials is proximate the array half-wave voltage for the light color illuminated during its respective color period.

17. The invention defined in claim 12, 13, 14, 15 or 16 wherein said addressing means is adapted to effect the activation during each color period with a plurality of discrete sub-period activations.

18. The invention defined in claim 12, 13, 14, 15 or 16 wherein said addressing means includes serial-in, parallel-out shift register means having an input adapted to receive an electrical signal containing said image information and outputs respectively coupled to elements of said light valve array.

19. The invention defined in claim 12, 13, 14, 15 or 16 wherein said addressing means is adapted to effect the activation during each color period with a plurality of discrete sub-period activations, respectively of different duration.

20. The invention defined in claim 12, 13, 14, 15 or 16 wherein said addressing means is adapted to effect the activation during each color period with a plurality of discrete sub-period activations respectively of different duration, the durations of said sub-periods being binarily related.

21. The invention defined in claim 19 wherein said addressing means includes serial-in, parallel-out shift register means having an input adapted to receive an electrical signal containing said image information and outputs respectively coupled to elements of said light valves.

22. The invention defined in claim 20 wherein said addressing means includes serial-in, parallel-out shift register means having an input adapted to receive an electrical signal containing said image information and outputs respectively coupled to elements of said light valves.

* * * * *